Jan. 12, 1960  C. J. HEINRICH  2,920,734
WHEEL-TYPE GRAVITY CONVEYORS
Filed Aug. 26, 1957  3 Sheets-Sheet 1

INVENTOR.
CHESTER J. HEINRICH
BY
ATTORNEYS

Jan. 12, 1960

C. J. HEINRICH 2,920,734

WHEEL-TYPE GRAVITY CONVEYORS

Filed Aug. 26, 1957

INVENTOR.
CHESTER J. HEINRICH
BY
ATTORNEYS

Jan. 12, 1960 C. J. HEINRICH 2,920,734
WHEEL-TYPE GRAVITY CONVEYORS
Filed Aug. 26, 1957 3 Sheets-Sheet 3

INVENTOR.
CHESTER J. HEINRICH
BY
ATTORNEYS

United States Patent Office 2,920,734
Patented Jan. 12, 1960

2,920,734

WHEEL-TYPE GRAVITY CONVEYORS

Chester J. Heinrich, Fairlawn, N.J.

Application August 26, 1957, Serial No. 680,367

8 Claims. (Cl. 193—35)

(Granted under Title 35, U.S. Code (1952), sec. 266)

The invention described herein may be manufactured and used by or for the Government of the United States of America for governmental purposes without the payment of any royalties thereon or therefor.

This invention relates to improvements in conveying apparatus, and more particularly pertains to an improved wheel-type gravity conveyor comprising a substantially continuous uninterrupted troughing track bed formed by a multiplicity of antifriction wheel devices upon which various bulk articles, such as packages, boxes and the like, can be positioned and caused to progress longitudinally of the bed by gravitational forces.

In the past, gravity-type conveyors have generally comprised relatively heavy, elongated, flat, trough-like frame sections having upturned side wall members between which extend a plurality of transversely disposed axle members which rotatably carry at spaced intervals therealong a plurality of wheel or roller elements. The outer peripheral surfaces of such wheel elements extend generally above the frame portion of the conveyor to provide an antifriction bed for articles placed thereon. The complete conveyor system is generally made up of a plurality of such rectangular frame members joined suitably at their respective ends with longitudinally contiguous conveyor frame sections, so as to provide an antifriction conveyor bed of substantially fixed width extending between remotely located loading and discharge stations.

The frame sections of the conveyors heretofore employed were of fixed width, and were provided with various but fixed numbers of roller or wheel elements so spaced relative to one another as to receive and support articles of a given size and weight range, the spacing and number of roller or wheel elements being manufacturer predetermined so as to provide adequate support for a given size and weight range of articles to be conveyed. To keep cost and weight within reasonable limits, and to prevent tipping and lodging between rollers, it has been common practice to manufacture conveyors in accordance with the precise requirements of a particular installation. Thus a user must buy either a relatively expensive large width conveyor having a multiplicity of closely spaced wheel elements, or must buy a number of sizes of conveyors to provide a range of applications.

In one particular area of conveyor use, the making of transfers of cargo between ships at sea, the weight and inflexibility of wheel type gravity conveyors are prohibitory obstacles to their use. Heavy support members and inordinately complicated rigging would have to be employed. As a result, present transfers of cargo between ships at sea are accomplished by loading provisions such as cargo nets, which are moved between ships by burtoning, housefall or highline rigging. These techniques are slow because of the additional handling required, require a large labor complement, and are also slow because the material is carried in one direction only, the time required for the return of the empty cargo net for reloading being about the same as the time required to transship a full net load to the receiving ship.

These disadvantages are substantially overcome by the present invention, hereinbelow described with particular reference to its application to transfer of cargo between ships at sea, which is the most difficult use situs. However, it is to be understood that use is not limited to ship to ship cargo transfers, but that the invention has salutary advantages when employed in a use where either or both of the supply and receiving stations are immobile areas.

The subject invention provides self-centering action in a gravity type skate wheel conveyor by means of flexible side and interior support members with different degrees of tension maintained between the side and the interior flexible support members.

The principal object of the present invention is to provide a conveyor construction adapted for use in transfer of cargo from a supply station to a receiving station.

Another object is to provide a conveyor construction adapted for use in transfer of cargo from a ship supply station to a ship receiving station.

A further object is to provide a conveyor construction of low fabrication and maintenance cost, light weight, high durability and facile in use under a wide variety of service conditions.

Other objects and many of the attendant advantages of this invention will be readily appreciated as the same becomes better understood by reference to the following detailed description when considered in connection with the accompanying drawings, wherein.

Similar numerals refer to similar parts throughout the several views.

Figure 1:
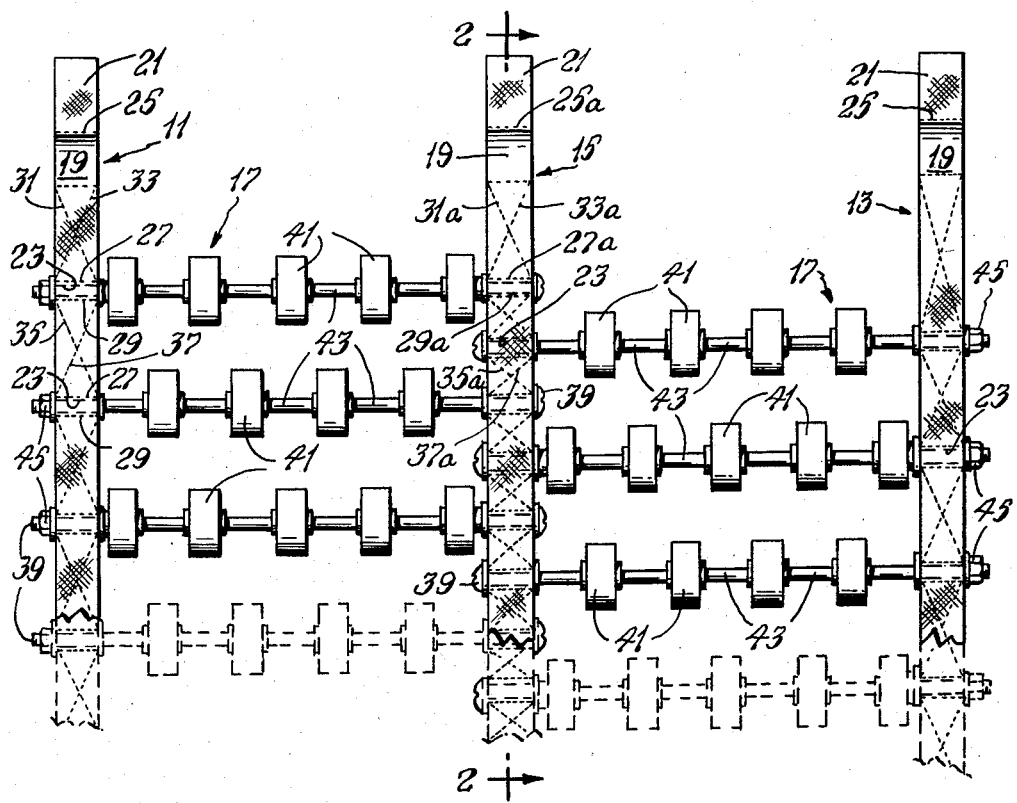
Fig. 1 is a fragmentary plan view of a conveying apparatus, showing a preferred embodiment of the invention.

The conveyor comprises a first exterior webbing member 11, a second exterior webbing member 13, and an interior webbing member 15, said members being held in substantially parallel alignment by a plurality of skate-wheel assemblies 17 alternately bridging the interior member 15 and one or the other of the exterior members 11 and 13.

Figure 2:
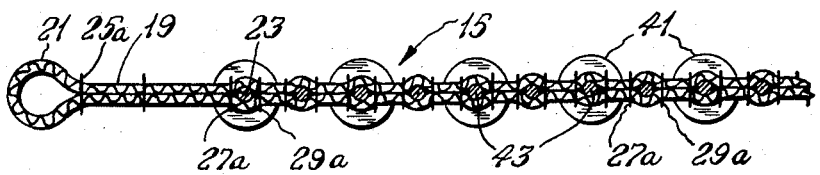
Fig. 2 is a section taken on the line 2—2 of Fig. 1.

The exterior webbing members 11 and 13 comprise flexible, substantially inelastic bands 19 of a material that has relatively high durability under the use, weather and temperature service conditions to be anticipated. A nylon webbing of Type XIII, Military Specification MIL–W–4088B (USAF) of 6000 pounds breaking strength, has been found suitable. The webbing is doubled and stitched, as shown in Figs. 1 and 2, to form end loops 21 and a plurality of retaining pockets 23 for the skate wheel support shafts hereinafter described. Preferably, a plurality of stitch lines 25 define the loop 21 and stitch lines 27 and 29 define each of the pockets 23, with criss-cross stitch lines 31 and 33 bridging a portion of the area between a stitch line 25 and the proximate stitch line 27, and criss-cross stitch lines 35 and 37 bridging the area between adjacent stitch lines 29 and 27. Preferably, the pockets 23 are equally spaced, and the stitching utilizes a suitable cord such as nylon No. 6 cord, Type III, Military Specification MIL-T-7807.

The interior webbing member 15 is constructed similarly, the stitch lines thereof being designated by the subscript "a" to denote correspondence to the similar stitch lines of members 11 and 13, but in the case of member 15 there are double the number of pockets 23 to permit alternate shaft bridging of member 15 and member 11 or 13, as shown.

Each pocket 23 of member 11 is connected to a pocket 23 of member 15 by a skate-wheel assembly 17, and each pocket 23 of member 13 is connected to a pocket 23 of member 15 by a skate-wheel assembly 17 to provide a plurality of parallel skate wheel assemblies each having its longitudinal axis normal to the length of members 11, 13 and 15, as shown in Fig. 1. The skate wheel assemblies that bridge members 11 and 15 and the skate wheel assemblies that bridge members 13 and 15 are secured alternately in the pockets 23 of member 15, as shown in Fig. 1.

Each skate wheel assembly comprises a skate wheel support shaft 39 adapted to be inserted in the pockets 23 and carrying a plurality of skate wheels 41 and spacer sleeves 43, and a retaining nut 45. The skate wheels 41 are assembled in staggered relation, one assembly 17 having a skate wheel 41 apposite member 15 and spacer sleeves 43 and skate wheels 41 alternating thereafter to a position apposite member 11, while the adjacent assembly 17 has a spacer sleeve 43 apposite member 15 and skate wheels 41 and spacer sleeve 43 alternating thereafter to a position apposite member 11, and the next adjacent assembly 17 is assembled similarly to that first above described, and so on.

In operation, a conveyor of suitable length is employed. When such a flexible gravity conveyor is used in a transfer at sea operation, one end of the conveyor is secured on the supply ship 51, as by mounting on a tension controlled drum 53. The other end of the conveyor is then pulled over the space between the ships and is secured to the receiving ship 55 in any suitable manner, such as by means of quick release pelican hooks 57. Since members 11 and 13 should be maintained at slightly greater tension than member 15, means can be provided for varying the tension of the members 11 and 13 relative to member 15, and such means are controlled preferably at the receiving ship end. With the supply ship end of the conveyor secured at a height greater than the height of the receiving ship end, material placed on the supply ship end will roll toward the lower end on the receiving ship, tending to remain in the center of the conveyor, proximate member 15, by reason of the self-centering action provided by the construction described above.

Figure 3:
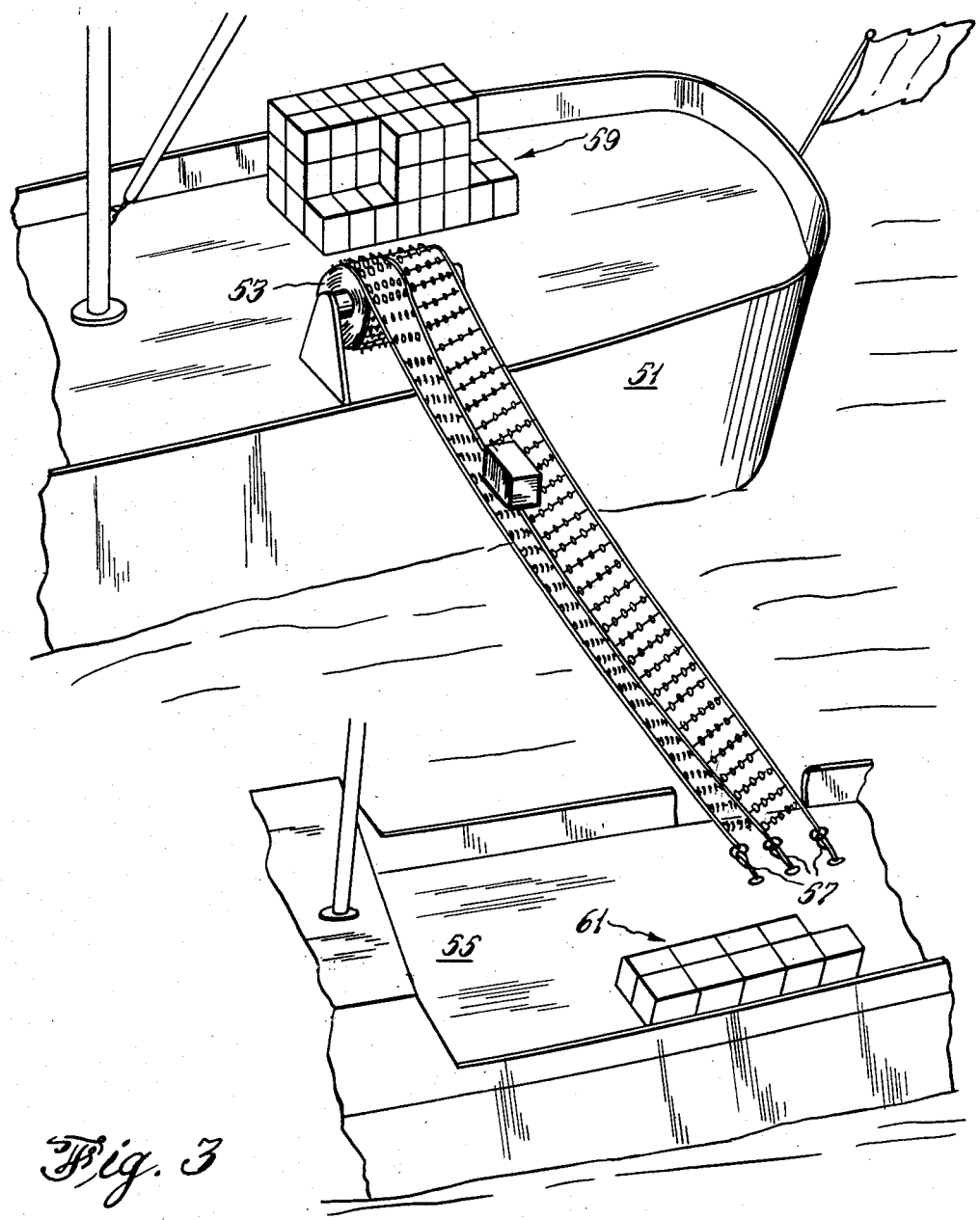
Fig. 3 is a diagrammatic showing of the conveying apparatus as employed in a transfer at sea operation.

Variations in distance between the two ships can be compensated for by paying out or taking in of the conveyor by the tensioning control drum, by manual means, or in any other suitable manner. The general arrangement of the transfer operation is shown diagrammatically in Fig. 3, cargo 59 being shown on the deck of the ship 51, a package 61 being shown in transit on the conveyor, and delivered cargo 61 being shown on the deck of the receiving ship 55.

Figure 4:
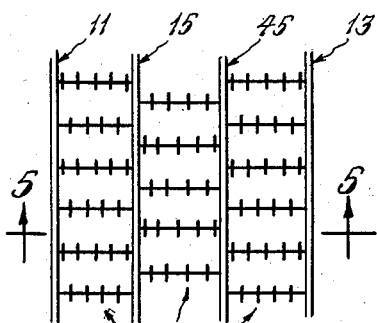
Fig. 4 is a schematic view of a modified form of the invention.
Figure 5:
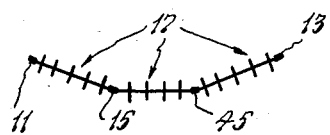
Fig. 5 is a schematic end view of the apparatus of Fig. 4.
Figure 6:
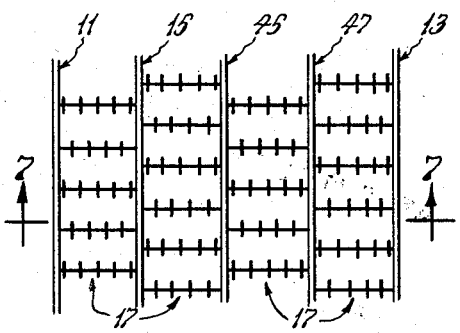
Fig. 6 is a schematic view of a further modification.
Figure 7:
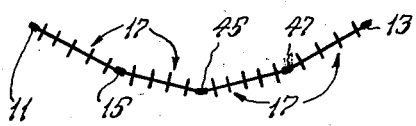
Fig. 7 is a schematic end view of the apparatus of Fig. 6.
Figure 8:
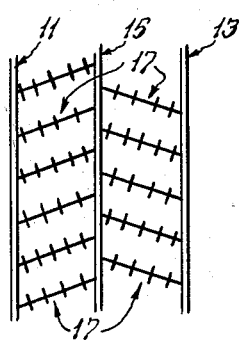
Fig. 8 is a schematic view of a still further modification.

Alternatively, the conveyor can comprise an assembly having a second interior webbing member 45 similar to member 15, as shown in Figs. 4 and 5, or additional interior webbing members 45 and 47 similar to member 15, as shown in Figs. 6 and 7 to permit improvement of troughing characteristics. As a further alternative, the skate wheel assemblies can be skewed from normality to members 11, 13 and 15, such varying of the angularity of the skate wheel shafts relative such members, as shown in Fig. 8, further modifying the troughing characteristics.

Obviously, many modifications and variations of the present invention are possible in the light of the above teachings. It is therefore to be understood that within the scope of the appended claims the invention may be practiced otherwise than as specifically described.

I claim:

1. A gravity-type conveyor comprising a plurality of flat band flexible webbing members, a plurality of shafts securing said webbing members in spaced relation, and a multiplicity of skate wheels carried rotatably at spaced intervals on said shafts.

2. A gravity-type conveyor comprising a first and a second elongated relatively narrow flat band flexible webbing member, a plurality of shafts securing said webbing members in spaced relation, and a multiplicity of skate wheels carried rotatably at spaced intervals on said shafts.

3. A gravity-type conveyor comprising a first and a second elongated relatively narrow flat band flexible webbing member aligned substantially parallel, said members having a plurality of transversely disposed retaining pockets, a plurality of shafts carried by said retaining pockets, and a multiplicity of skate wheels mounted rotatably at spaced intervals on said shafts.

4. A gravity-type conveyor comprising a pair of exterior elongated relatively narrow flat band flexible webbing members and at least one interior elongated relatively narrow flat band webbing member, each member having a plurality of transversely disposed retaining pockets, a plurality of shafts, each of said shafts being carried by a retaining pocket of said interior member and a retaining pocket of one of said exterior members, and a multiplicity of skate wheels mounted rotatably at spaced intervals on said shafts.

5. A gravity-type conveyor comprising a pair of exterior elongated relatively narrow webbing members and at least one interior elongated relatively narrow webbing member, each member being doubled upon itself and stitched to define at least one end loop portion and a plurality of transversely disposed retaining pockets, and a multiplicity of skate wheels mounted rotatably at spaced intervals on a plurality of shafts, each of said shafts being carried by a retaining pocket of said interior member and a retaining pocket of one of said exterior members.

6. A gravity-type conveyor comprising a pair of exterior elongated relatively narrow webbing members and at least one interior elongated relatively narrow webbing member, each member being doubled upon itself and stitched to define at least one end loop portion and a plurality of transversely disposed retaining pockets, and a multiplicity of skate wheels mounted rotatably at spaced intervals on a plurality of shafts, a first of said shafts being carried by a retaining pocket of said interior member and a retaining pocket of one of said exterior members, and a second of said shafts being carried by the next adjacent retaining pocket of said interior member and a retaining pocket of the other of said exterior members.

7. A gravity-type conveyor comprising a pair of exterior elongated relatively narrow webbing members and a pair of interior elongated relatively narrow webbing members, each member being doubled upon itself and stitched to define at least one end loop portion and a plurality of transversely disposed retaining pockets, and a multiplicity of skate wheels mounted rotatably at spaced intervals on a plurality of shafts, a first plurality of said shafts being carried by a retaining pocket of each of said interior members and a second plurality of said shafts being carried by a retaining pocket of said interior member and a retaining pocket of one of said exterior members.

8. A gravity-type conveyor comprising a pair of exterior elongated relatively narrow webbing members and an interior elongated relatively narrow webbing member, each member being doubled upon itself and stitched to define at least one end loop portion and a plurality of transversely disposed retaining pockets defining an angle other than normal to the length of said members, and a multiplicity of skate wheels mounted rotatably at spaced intervals on a plurality of shafts, each of said shafts being carried by a retaining pocket of said interior member and a retaining pocket of one of said exterior members, whereby pairs of said shafts define a plurality of V's.

References Cited in the file of this patent

UNITED STATES PATENTS

| | | |
|---|---|---|
| 1,406,709 | Wilson | Feb. 14, 1922 |
| 1,455,977 | Wentz | May 22, 1923 |
| 1,906,288 | Twomley | May 2, 1933 |
| 2,189,143 | Harris | Feb. 6, 1940 |
| 2,600,747 | Faust | June 17, 1952 |